No. 702,037. Patented June 10, 1902.
T. STIGLIZ.
MACHINE FOR WORKING STONE SURFACES.
(Application filed June 14, 1900.)
(No Model.) 2 Sheets—Sheet 1.

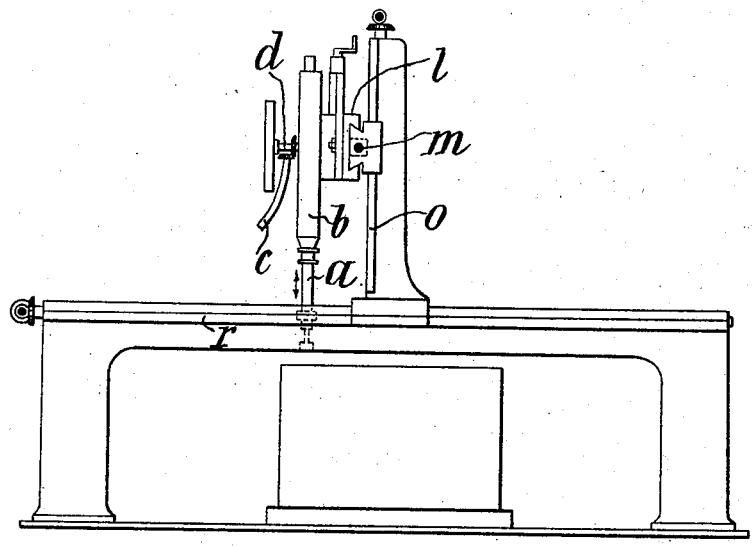
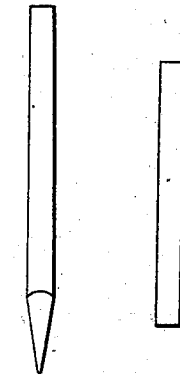
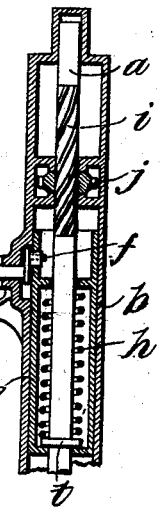
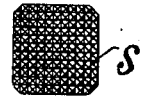

UNITED STATES PATENT OFFICE.

THEODOR STIGLIZ, OF VIENNA, AUSTRIA-HUNGARY.

MACHINE FOR WORKING STONE-SURFACES.

SPECIFICATION forming part of Letters Patent No. 702,037, dated June 10, 1902.

Application filed June 14, 1900. Serial No. 20,313. (No model.)

*To all whom it may concern:*

Be it known that I, THEODOR STIGLIZ, a subject of the Emperor of Austria-Hungary, residing at Vienna, in the Province of Lower Austria, in the Empire of Austria-Hungary, have invented certain new and useful Improvements in Machines for Working Stone-Surfaces; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a machine for working stone, especially for dressing the surface of stone of any shape.

This machine imparts to the tool a rotation in one direction on its own axis and a traveling movement along the surface to be worked in addition to the reciprocating motion. For this purpose the tool is attached to a rod, which is reciprocated in the direction of its axis by a crank or by a piston actuated by pressure and has a screw-threaded portion which passes through a nut provided with a ratchet-wheel. This ratchet-wheel is engaged by a spring-pawl in such manner that the nut cannot rotate in one direction. Thus at every reciprocation the tool is rotated through a certain angle. The casing in which the rod moves is attached to a sliding block, which is caused to travel along a guide by a screw-spindle turned automatically or by hand.

Figure 1:
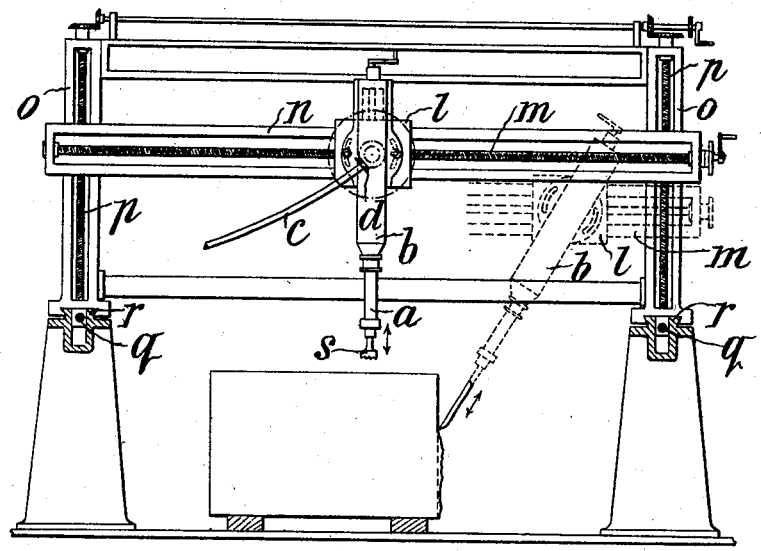
Figure 3:
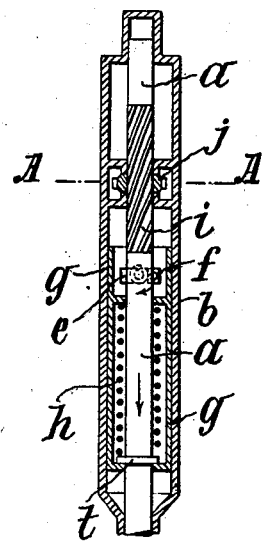
Figure 4:
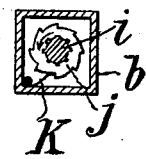

In the accompanying drawings, Figure 1 is a front elevation, partly in section, of a machine constructed in accordance with my invention and shows the tool-holder in two positions. Fig. 2 is a side elevation. Fig. 3 is a section through the casing of the working rod, and Fig. 4 is a section on the line A A of Fig. 3. Figs. 5 and 6 are a side view and an under side plan, respectively, of the tool for one form of dressing; and Figs. 7 and 8 are a side view and under side plan, respectively, of the tool for another form; and Fig. 9 is a view, partly in longitudinal section, at right angles to Fig. 3.

$a$ is a rod to the lower end of which the tool is attached. This rod has a reciprocating motion in the casing $b$ in the direction of its axis and is at the same time rotated. To effect the reciprocating motion, any mechanism commonly employed in percussive boring may be used. In the present instance the movement is obtained through a flexible shaft $c$, driven by a suitable source of power and itself driving, by bevel-gearing $d$, a short shaft $e$, Fig. 3. The latter carries a crank-pin $f$, which engages by means of a sliding block with a horizontal groove in the piston $g$, which slides in the casing $b$. In its up-and-down movement the piston carries with it the rod $a$, which is pressed against the bottom of the piston by a spring $b$ bearing at its upper end against a flange on the inner wall of the piston and at its lower end on a collar $t$ on the rod $a$. The object of this spring is to ameliorate the effect of too strong a blow. The upper part of the rod $a$ is provided with the screw-thread $i$ and passes through the nut $j$, the perimeter of which has ratchet-teeth engaging with the spring-pawl $k$, so that rotation of the nut in the direction of the hands of a clock is prevented. Thus the rod $a$ is rotated by its right-hand screw-thread in the direction of the arrow in Fig. 4 at every upward movement.

The casing $b$ can be fixed vertically to the sliding block $l$, which travels on the guide-rail $n$, being moved by the screw-spindle $m$. It is advantageous, however, to pivot the casing $b$ on the sliding block $l$, so that it can be fixed in any inclined position, as indicated in Fig. 1.

The guide-rail $n$ is mounted on vertical screw-spindles $p$ in guides $o$, the spindles being rotated by gearing common to both, so that the guide-rail can be raised and lowered by one movement. The guides $o$ are united by transverse rods and form therewith a frame, which is made to travel on guide-rails $r$ by screw-spindles $q$, rotated by gearing common to both.

By means of this machine the surface of any kind of stone can be dressed. For one form of dressing is used the tool $s$, Fig. 5, the working face of which is provided with pyramidal points. The screw-spindle $m$ can be rotated by hand or otherwise for the progressive movement of the tool over the surface. When one strip of surface has been worked, the spindles $q$ are rotated to shift the framing so that the tool may work a fresh strip. Since the tool is rotated to some extent on its axis, at every upward movement each of its pyramidal points always strikes another place on the stone, so that a very fine and uniform dressing is obtained.

Very clean and even surfaces are obtained with this machine.

For dressing stone-surfaces by means of the tool shown in Figs. 7 and 8 the stone is laid so that the surface to be worked is vertical, and the casing *b* is inclined, so that the tool strikes the stone at the necessary angle. During this work the tool is gradually lowered by means of the screw-spindles *p*.

It is obvious that instead of causing the tool to travel this may be stationary and the stone may travel.

I claim—

1. A stone-cutting machine comprising a bed having longitudinal rails, vertical guides on said rails, means to simultaneously move the vertical guides, a transverse guide-rail vertically movable in said guides, a tool-holder movable along the transverse guide-rail and rotatably adjustable, and means to actuate a tool held in the holder.

2. A stone-cutting machine comprising a bed having longitudinal rails, screws therein simultaneously movable, vertical guides on said rails moved by said screws, a vertical screw in each vertical guide said screws simultaneously rotated, a vertically-movable guide-rail *n* guided in the vertical guides and moved by the screws therein, an adjustable tool-holder movable along the rail *n*, means to longitudinally move the tool-holder and means to mechanically reciprocate the tool, substantially as and for the purposes set forth.

In testimony that I claim the foregoing as my invention I have signed my name in presence of two subscribing witnesses.

THEODOR STIGLIZ.

Witnesses:
JOSEF RUBERCH,
ALVESTO S. HOGUE.